United States Patent [19]

Talley

[11] Patent Number: 5,027,747
[45] Date of Patent: Jul. 2, 1991

[54] APPARATUS AND METHOD FOR APPLYING LIQUID TO AN ANIMAL

[76] Inventor: Larry J. Talley, Box 45, Rte. 1, Rush Hill, Mo. 65280

[21] Appl. No.: 535,966

[22] Filed: Jun. 11, 1990

[51] Int. Cl.⁵ ............................................. A01K 13/00
[52] U.S. Cl. ............................................... 119/157
[58] Field of Search .................................. 119/157, 159

[56] References Cited

U.S. PATENT DOCUMENTS

| | | |
|---|---|---|
| 987,433 | 3/1911 | Crawford ........................ 119/157 |
| 1,129,977 | 3/1915 | Hagny ............................. 119/157 |
| 1,201,351 | 10/1916 | Rule ................................ 119/157 |
| 1,568,226 | 1/1926 | Larson . |
| 1,582,144 | 4/1926 | Pflaum . |
| 1,627,516 | 5/1927 | Larson . |
| 2,865,329 | 12/1958 | Elliott ............................... 119/83 |
| 2,976,841 | 3/1961 | Scheffer ........................... 119/83 |
| 4,324,202 | 4/1982 | Stonestreet et al. ............ 119/157 X |
| 4,747,371 | 5/1988 | Leopold ........................... 119/83 |
| 4,799,456 | 1/1989 | Young .............................. 119/83 |

Primary Examiner—Robert P. Swiatek
Attorney, Agent, or Firm—Senniger, Powers, Leavitt & Roedel

[57] ABSTRACT

An applicator for applying liquid, such as insecticide or medicine, to the coat of an animal. The applicator comprises a reservoir for containing the liquid, an anchor for mounting the reservoir above an animal pathway; and a plurality of flexible wicks depending from the reservoir. The wicks have proximal ends communicating with the interior of the reservoir so that liquid in the reservoir communicates with and moistens the wicks, and distal ends adapted for extending into the animal pathway. An animal passing through the pathway contacts the moistened wicks and the wicks apply the liquid to the animal. A method of applying liquid to an animal with the applicator is also disclosed.

13 Claims, 1 Drawing Sheet

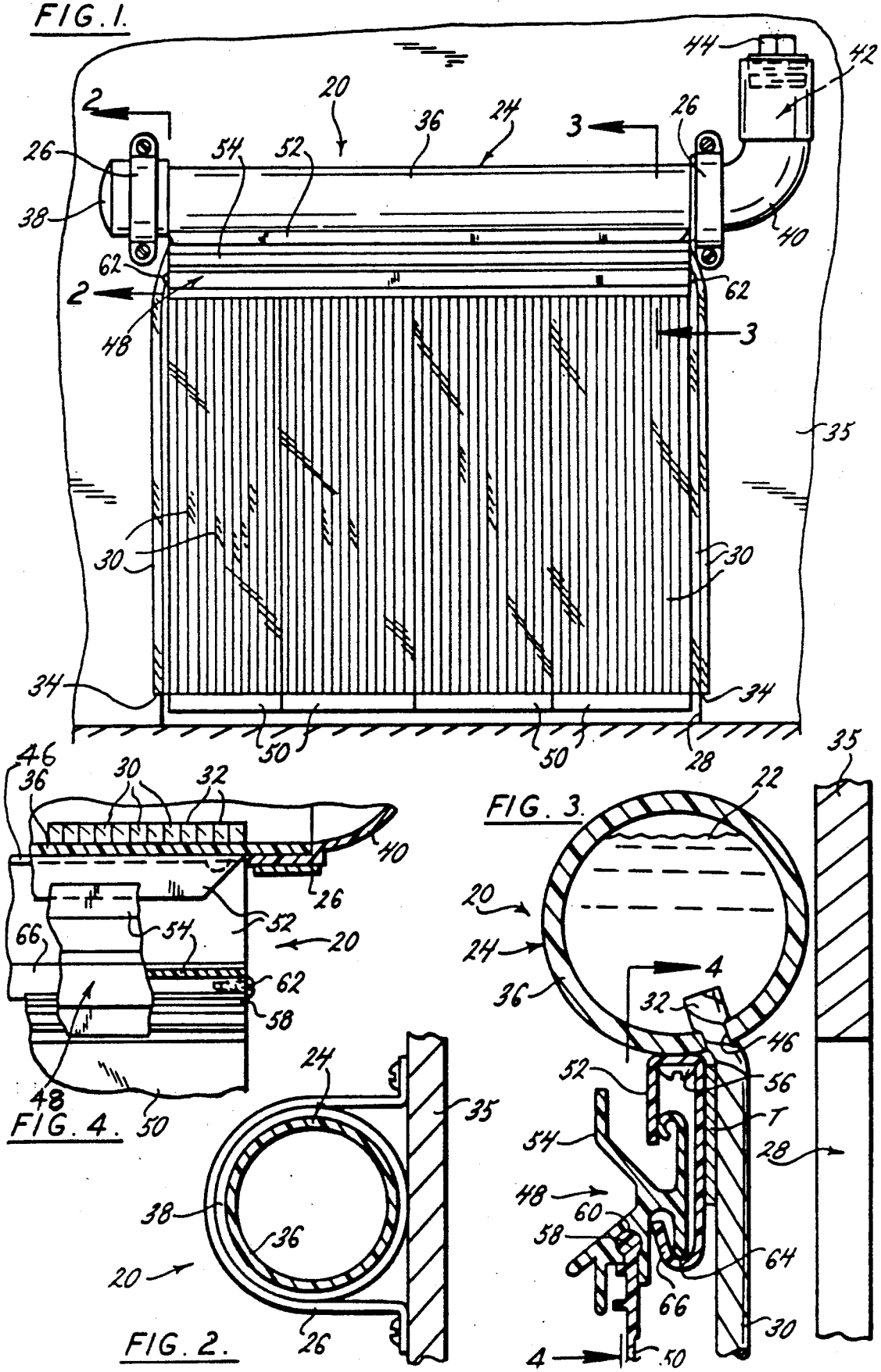

APPARATUS AND METHOD FOR APPLYING LIQUID TO AN ANIMAL

BACKGROUND OF THE INVENTION

This invention relates generally to applicators, and in particular to applicators for applying liquid, such as insecticide or medicine, to an animal.

Insecticides and medicines often need to be applied to the coats of pets, such as dogs and cats. In some circumstances and in some environments it may be necessary to apply the insecticide or medicine frequently. For example, to protect a pet living in warm climates from fleas and ticks, it is generally necessary to frequently apply insecticide to the coat of the pet. Liquid insecticide and medicines are generally applied manually to the coat of the animal by spraying, bathing, or sponging.

A problem associated with such manual applications is that the insecticide or liquid is often not applied frequently enough. Because of the time and inconvenience involved in manually applying the liquid, many pet owners neglect to apply the liquid frequently enough. However, if insecticide is not applied sufficiently often, fleas and ticks will likely infest both the pet and the dwelling place of the pet.

SUMMARY OF THE INVENTION

Among the objects of the present invention may be noted the provision of an improved apparatus and method for applying liquid, such as insecticide or medicine, to the coat of an animal; the provision of such an apparatus and method in which the liquid is automatically applied to the coat of the animal; and the provision of such an apparatus and method in which the liquid is applied to the animal whenever the animal passes through a particular pathway.

Generally, the apparatus of the present invention is an applicator adapted for applying liquid, such as insecticide or medicine, to the coat of an animal. The applicator comprises a reservoir for containing the liquid, means for mounting the reservoir above an animal pathway, and a plurality of flexible wicks depending from the reservoir. These wicks have proximal ends communicating with the interior of the reservoir so that liquid in the reservoir communicates with and moistens the wicks, and distal ends adapted for extending into the animal pathway. An animal passing through the pathway contacts the moistened wicks and the wicks apply the liquid to the animal.

According to the method of the present invention, the liquid is applied to the coat of an animal by the use of an applicator. The applicator comprises a hollow reservoir for containing the liquid and a plurality of wicks, depending from the reservoir, and having proximal ends communicating with the interior of the reservoir and distal ends adapted for extending into an animal pathway. The wicks are moistened by the liquid in the reservoir. The applicator is mounted above an animal pathway so that the wicks depend from the reservoir and extend into the pathway. Animals are passed through the pathway so that the animals contact the moist wicks and the wicks apply the liquid to the animals. The apparatus thus automatically provides frequent applications of the liquid, without the difficulties and mess encountered with manual application. Moreover, the liquid is applied on a frequent and regular basis. Likewise, the method provides for frequent and regular application of the liquid without the effort and mess of conventional manual applications. The apparatus and method thus help ensure that the animal is properly cared for.

These and other advantages will be in part apparent and in part pointed out hereinafter.

BRIEF DESCRIPTION OF THE DRAWINGS

FIG. 1 is a front elevational view of an applicator of the present invention mounted above an animal pathway;

FIG. 2 is a partial cross-sectional view of the applicator taken along the plane of line 2—2 in FIG. 1 showing an anchor for mounting the reservoir above the animal pathway;

FIG. 3 is a partial cross-sectional view of the applicator taken along the plane of line 3—3 in FIG. 1 showing the track and rail for releasably securing the flexible shield to the reservoir and showing the interior of the reservoir; and FIG. 4 is a partial cross-sectional view, taken along the plane of line 4—4 in FIG. 3, showing the track, the rail, and the connection of the flexible shield to the rail.

Corresponding reference numerals indicate corresponding parts throughout the several views of the drawings.

DETAILED DESCRIPTION OF THE PREFERRED EMBODIMENT

An applicator constructed according to the principles of this invention is indicated generally as 20 in FIGS. 1-4. The applicator 20 is adapted for applying liquid 22 (see FIG. 3), such as insecticide or medicine, to an animal (not shown). The applicator 20 comprises a generally tubular reservoir 24 for containing the liquid 22, anchors 26 for mounting the reservoir 24 above an animal pathway 28, and a plurality of flexible wicks 30 depending from the reservoir 24. The wicks 30 have proximal ends 32 communicating with the interior of the reservoir 24, and distal ends 34 adapted for extending into the animal pathway 28. The liquid 22 in the reservoir 24 communicates with and moistens the wicks 30 so that when an animal passing through the pathway 28 contacts the moistened wicks 30, the wicks 30 apply the liquid 22 to the animal. Preferably, the pathway 28 is a doorway through a structure 35, such as the doorway to a doghouse or an animal door through the door of a house, so that whenever the animal exits the doghouse or exits the house through the animal door, liquid is applied to the animal.

The reservoir 24 is preferably made of PVC and includes a generally cylindrical body 36, an end cap 38 fixed to one end of the body 36, and an upwardly turned elbow 40 fixed to the other end of the body 36. The upwardly turned end of the elbow 40 includes an opening or port 42 for supplying the liquid 22 to the reservoir 24. A threaded screw cap 44 is releasably secured in the upwardly turned end of the elbow 40 and constitutes means for closing the port 42 to prevent liquid 22 in the reservoir 24 from flowing out the port 42. The body 36 includes a plurality of holes, or preferably a longitudinally extending slot 46 through which the proximal ends 32 of the wicks 30 extend.

The applicator 20 may further include a flexible shield, designated generally as 48, depending from the reservoir 24 and adjacent to the wicks 30 on one side. The shield 48 constitutes means for shielding the animal from the moist wicks 30 as the animal passes through the pathway 28 in one direction. The shield 4B could be one piece but preferably comprises a plurality of flexible strips 50 in side-by-side relation. As shown in FIG. 3, the strips 50 are releasably secured to the body 36 of the reservoir 24 by a track 52 and rail 54. The track 52 is secured to the body 36 by a plurality of screws 56 and the rail 54 is adapted to be slidably received in the track 52. Double-sided tape T is sandwiched between and affixed to the track 52 and wicks 30 to orient the wicks 30 downward. The proximal end of each strip 5? has a bead 58 which is slideably received within a channel 60 in the rail 54. Screws 62 are threaded into the ends of the channel 60 to retain the strips 50 in the channel 60. The rail 54 can be disengaged from the track 52 by sliding the rail 54 out of the track 52. Also, because of the configuration of the track 52 and rail 54 (shown in FIG. 3), the rail can be disengaged by lifting the rail 54 upward until the bottom edge 64 of the rail 54 clears the bottom lip 66 of the track 52 and then pivoting the bottom edge 64 outwardly and pulling the rail 54 away from the track 52. Thus, the shield 48 is releasably secured to the reservoir 24. With the shield 48 in place, an animal passing through the pathway 28 from right to left in FIG. 3 will contact the moist wicks 30 and be treated with the liquid 22. But an animal passing through the pathway 28 in the opposite direction, i.e., from left to right in FIG. 3, contacts the flexible shield 48, positioned between the animal and the wicks 30, rather than the wicks 30 and is thereby substantially shielded from the liquid 22.

In operation, the applicator 20 is mounted above the animal pathway 28 so that the wicks 30 and shield 48 depend from the reservoir 24 and extend into the pathway 28. Preferably, the shield 48 is positioned on the outside environment side of the wicks 30. When the animal exits the house or doghouse through the pathway 28, the animal brushes against the wicks 30 and liquid 22 is applied to the animal. When the animal enters the house or doghouse through the pathway 28, the animal is substantially shielded from the wicks 30 by the shield 48. Thus, every time the animal exits through the pathway 28, liquid 22 is automatically applied to the animal's coat. Conversely, when the animal enters through the pathway 28, it is shielded from the liquid 22. This prevents the liquid from being spread inside the house or doghouse, and also regulates the total amount of liquid applied to the animal. Also, if the liquid 22 is an insecticide, the applicator 20 acts as a barrier to prevent insects from entering the house through the pathway.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An applicator for applying liquid, such as insecticide or medicine, to an animal, comprising a reservoir for containing the liquid, means for mounting the reservoir above an animal pathway, a plurality of flexible wicks depending from the reservoir having proximal ends communicating with the interior of the reservoir so that liquid in the reservoir communicates with and moistens the wicks and distal ends adapted for extending into the animal pathway whereby an animal passing through the pathway contacts the moistened wicks and the wicks apply the liquid to the animal, and a flexible shield depending from the reservoir and adjacent to the wicks on one side so that when an animal passes through the pathway in one direction the flexible shield is positioned between the animal and the wicks to shield the animal from the wicks, but when the animal passes through the pathway in the opposite direction the animal contacts the wicks and is treated with the liquid.

2. The applicator of claim 1 wherein the flexible shield comprises a plurality of flexible strips in side-by-side relation.

3. The applicator of claim 1 further comprising means for releasably securing the shield to the reservoir.

4. The applicator of claim 3 wherein the means for releasably securing the shield to the reservoir comprises a track on one of the shield and reservoir, and a rail, adapted to be slidably received in the track, on the other.

5. In combination with a doorway in a structure for the passage of an animal, an applicator for applying liquid, such as insecticide or medicine, to an animal, the applicator comprising a reservoir mounted above the doorway for containing the liquid, a plurality of flexible wicks depending from the reservoir having proximal ends communicating with the interior of the reservoir so that liquid in the reservoir communicates with and moistens the wicks and distal ends for extending into the doorway whereby an animal passing through the doorway contacts the moistened wicks and the wicks apply the liquid to the animal, and a flexible shield depending from the reservoir and adjacent to the wicks on one side so that when an animal passes through the doorway in one direction the flexible shield is positioned between the animal and the wicks to shield the animal from the wicks, but when the animal passes through the doorway in the opposite direction the animal contacts the wicks and is treated with the liquid.

6. The combination of claim 5 further comprising a port in the reservoir for supplying the liquid to the reservoir.

7. The combination of claim 6 further comprising means for closing the port to prevent liquid in the reservoir from flowing out the port.

8. The combination of claim 5 further comprising means for shielding the animal from the wicks as the animal passes through the doorway in one direction.

9. The combination of claim 5 wherein the flexible shield comprises a plurality of flexible strips in side-by-side relation.

10. The combination of claim 5 further comprising means for releasably securing the shield to the reservoir.

11. The combination of claim 10 wherein the means for releasably securing the shield to the reservoir comprises a track on one of the shield and reservoir, and a rail, adapted to be slidably received in the track, on the other.

12. The combination of claim 5 wherein the structure comprises a door and the doorway comprises an opening through the door.

13. The combination of claim 5 wherein the structure comprises a doghouse and the doorway comprises a passageway through the doghouse.

* * * * *